United States Patent
Lee et al.

(10) Patent No.: US 10,397,952 B2
(45) Date of Patent: Aug. 27, 2019

(54) METHOD AND APPARATUS FOR PERFORMING CONTENTION RESOLUTION FOR CONTENTION BASED PUSCH TRANSMISSION IN WIRELESS COMMUNICATION SYSTEM

(71) Applicant: LG ELECTRONICS INC., Seoul (KR)

(72) Inventors: Youngdae Lee, Seoul (KR); Hanbyul Seo, Seoul (KR); Seungjune Yi, Seoul (KR); Sunyoung Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/569,305

(22) PCT Filed: May 2, 2016

(86) PCT No.: PCT/KR2016/004591
§ 371 (c)(1),
(2) Date: Oct. 26, 2017

(87) PCT Pub. No.: WO2016/175630
PCT Pub. Date: Nov. 3, 2016

(65) Prior Publication Data
US 2018/0124827 A1    May 3, 2018

Related U.S. Application Data

(60) Provisional application No. 62/154,719, filed on Apr. 30, 2015.

(51) Int. Cl.
*H04W 74/08* (2009.01)
*H04L 1/18* (2006.01)
(Continued)

(52) U.S. Cl.
CPC ............. *H04W 74/08* (2013.01); *H04L 1/18* (2013.01); *H04L 1/1816* (2013.01);
(Continued)

(58) Field of Classification Search
CPC .......... H04W 74/08; H04W 74/04; H04L 1/18
See application file for complete search history.

(56) References Cited

U.S. PATENT DOCUMENTS

2010/0329220 A1    12/2010    Kim et al.
2011/0243080 A1    10/2011    Chen et al.
(Continued)

FOREIGN PATENT DOCUMENTS

| JP | 2011518464 | 6/2011 |
|---|---|---|
| KR | 1020120123417 | 11/2012 |
| WO | 2009114401 | 9/2009 |

*Primary Examiner* — Shukri Taha
(74) *Attorney, Agent, or Firm* — Dentons US LLP (57) ABSTRACT

A method and apparatus for performing contention resolution for contention based physical uplink shared channel (CB-PUSCH) transmission in a wireless communication system is provided. A user equipment (UE) performs a first hybrid automatic repeat request (HARQ) transmission on a CB-PUSCH to a network, and determines whether contention on the CB-PUSCH is resolved. The CB-PUSCH is a channel for UL data allocated by a pre-configured UL grant which is shared by multiple UEs. If a UL grant includes an identity of the UE, it is determined that contention on the CB-PUSCH is resolved. The UE may perform a second HARQ transmission for the first HARQ transmission on a PUSCH to the network by using the UL grant.

9 Claims, 8 Drawing Sheets

(51) Int. Cl.
*H04L 5/00* (2006.01)
*H04W 72/12* (2009.01)

(52) U.S. Cl.
CPC .............. *H04L 1/1822* (2013.01); *H04L 5/00* (2013.01); *H04W 72/121* (2013.01); *H04W 72/1268* (2013.01)

(56) References Cited

U.S. PATENT DOCUMENTS

| | | | |
|---|---|---|---|
| 2012/0281566 A1* | 11/2012 | Pelletier | H04W 76/27 370/252 |
| 2013/0034071 A1 | 2/2013 | Lee et al. | |
| 2013/0163537 A1* | 6/2013 | Anderson | H04W 72/1284 370/329 |
| 2015/0057011 A1* | 2/2015 | Di Girolamo | H04W 74/0808 455/454 |
| 2016/0100430 A1* | 4/2016 | Dabeer | H04W 28/0278 370/329 |

* cited by examiner

METHOD AND APPARATUS FOR PERFORMING CONTENTION RESOLUTION FOR CONTENTION BASED PUSCH TRANSMISSION IN WIRELESS COMMUNICATION SYSTEM

CROSS-REFERENCE TO RELATED APPLICATIONS

This application is the National Stage filing under 35 U.S.C. 371 of International Application No. PCT/KR2016/004591, filed on May 2, 2016, which claims the benefit of U.S. Provisional Application No. 62/154,719 filed on Apr. 30, 2015, the contents of which are all hereby incorporated by reference herein in their entirety.

BACKGROUND OF THE INVENTION

Field of the Invention

The present invention relates to wireless communications, and more particularly, to a method and apparatus for performing contention resolution for contention based physical uplink shared channel (CB-PUSCH) transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Packet data latency is one of the performance metrics that vendors, operators and also end-users (via speed test applications) regularly measure. Latency measurements are done in all phases of a radio access network system lifetime, when verifying a new software release or system component, when deploying a system and when the system is in commercial operation. Better latency than previous generations of 3GPP radio access technologies (RATs) was one performance metric that guided the design of LTE. LTE is also now recognized by the end-users to be a system that provides faster access to internet and lower data latencies than previous generations of mobile radio technologies. In the 3GPP, much effort has been put into increasing data rates from the first release of LTE (Rel-8) until the most recent one (Rel-12). However, with regard to further improvements specifically targeting the delays in the system little has been done.

Packet data latency is important not only for the perceived responsiveness of the system, but it is also a parameter that indirectly influences the throughput. In addition, to achieve really high bit rates, UE L2 buffers need to be dimensioned correspondingly. The longer the round trip time (RTT) is, the bigger the buffers need to be. The only way to reduce buffering requirements in the UE and eNB side is to reduce latency. Further, radio resource efficiency could also be positively impacted by latency reductions. Lower packet data latency could increase the number of transmission attempts possible within a certain delay bound, hence higher block error rate (BLER) targets could be used for the data transmissions, freeing up radio resources but still keeping the same level of robustness for users in poor radio conditions. The increased number of possible transmissions within a certain delay bound, could also translate into more robust transmissions of real-time data streams (e.g. voice over LTE (VoLTE)), if keeping the same BLER target. This may improve the VoLTE voice system capacity.

Various pre-scheduling strategies can be used to lower the latency to some extent, but similarly to shorter scheduling request (SR) interval introduced in Rel-9, they do not necessarily address all efficiency aspects. Accordingly, various techniques to reduce latency, e.g. reduced transmission time (TTI) and processing time, contention based physical uplink shared channel (CB-PUSCH) transmission, etc., have been discussed.

SUMMARY OF THE INVENTION

The present invention provides a method and apparatus for performing contention resolution for contention based physical uplink shared channel (CB-PUSCH) transmission in a wireless communication system. The present invention provides a method and apparatus for performing hybrid automatic repeat request (HARQ) retransmissions for CB-PUSCH transmission.

In an aspect, a method for performing, by a user equipment (UE), contention resolution for contention based physical uplink shared channel (CB-PUSCH) transmission in a wireless communication system is provided. The method includes performing a first hybrid automatic repeat request (HARQ) transmission on a CB-PUSCH to a network, and determining whether contention on the CB-PUSCH is resolved. The CB-PUSCH is a channel for UL data allocated by a pre-configured UL grant which is shared by multiple UEs.

In another aspect, a user equipment (UE) in a wireless communication system is provided. The UE includes a memory, a transceiver, and a processor coupled to the memory and the transceiver. The processor is configured to perform a first hybrid automatic repeat request (HARQ) transmission on a contention based physical uplink shared channel (CB-PUSCH) to a network, and determine whether contention on the CB-PUSCH is resolved. The CB-PUSCH is a channel for UL data allocated by a pre-configured UL grant which is shared by multiple UEs.

CB-PUSCH transmission can be performed efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
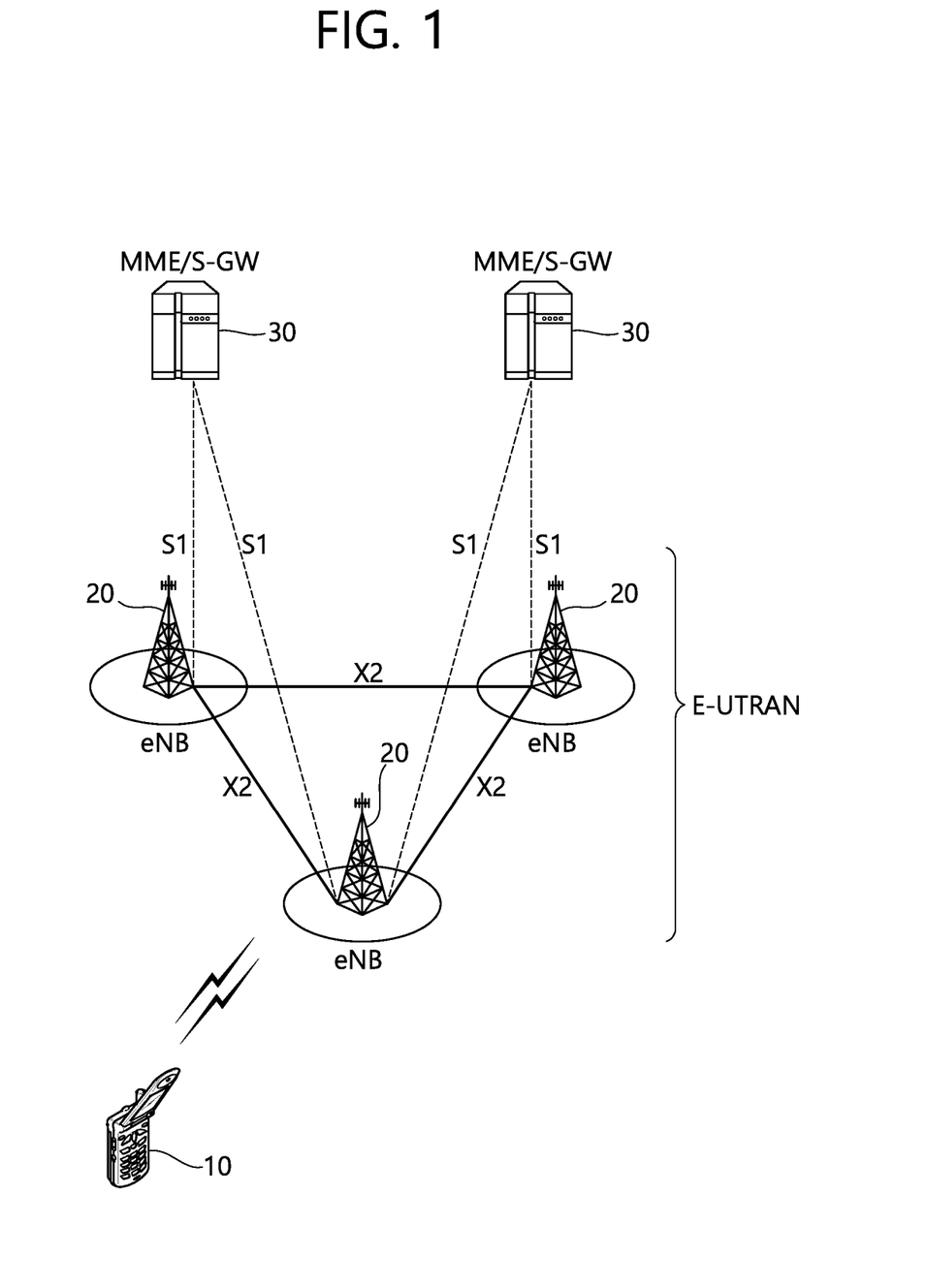
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE refers to a communication equipment carried by a user. The UE may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE and may be referred to as another terminology, such as a base station (BS), an access point, etc. One eNB 20 may be deployed per cell.

Hereinafter, a downlink (DL) denotes communication from the eNB 20 to the UE 10, and an uplink (UL) denotes communication from the UE to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) and a system architecture evolution (SAE) gateway (S-GW). The MME/S-GW 30 may be positioned at the end of the network and connected to an external network. For clarity, MME/S-GW 30 will be referred to herein simply as a "gateway," but it is understood that this entity includes both the MME and S-GW.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE is connected to the eNB 20 via a Uu interface. The eNBs 20 are connected to each other via an X2 interface. Neighboring eNBs may have a meshed network structure that has the X2 interface. A plurality of nodes may be connected between the eNB 20 and the gateway 30 via an Si interface.

Figure 2:
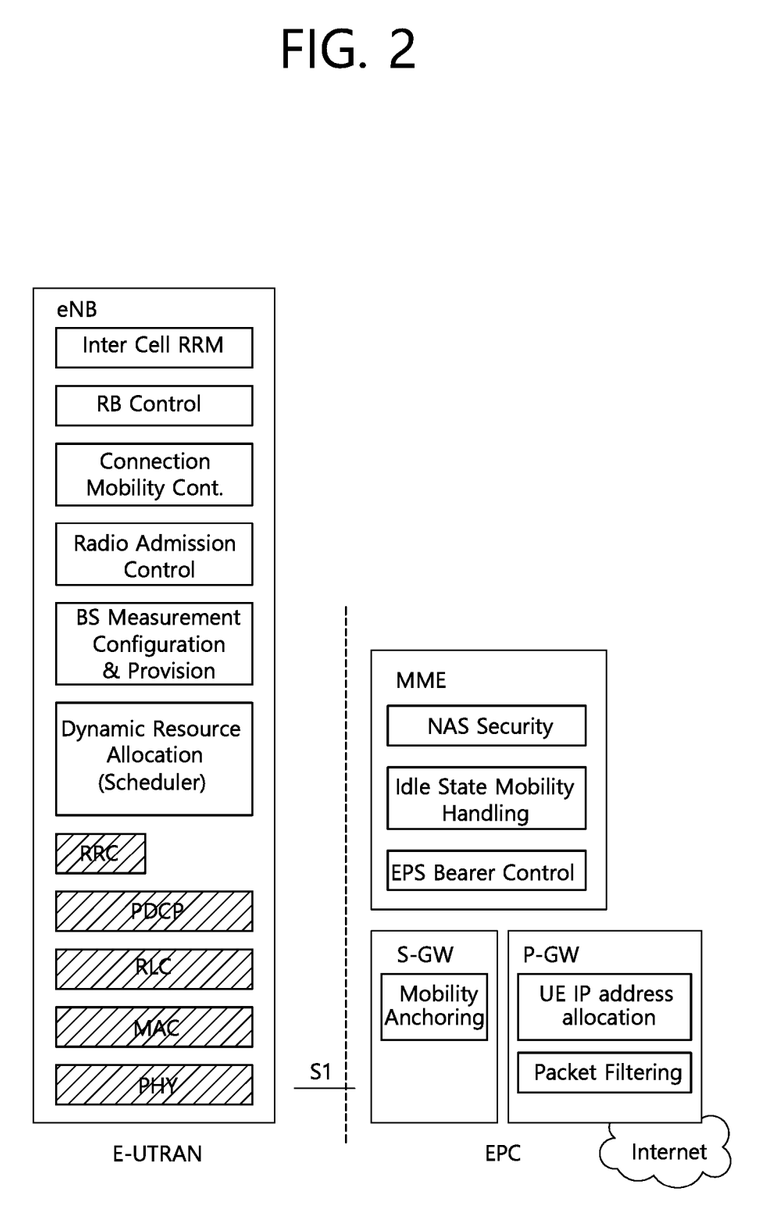
FIG. 2 shows a block diagram of architecture of a typical E-UTRAN and a typical EPC.

FIG. 2 shows a block diagram of architecture of a typical E-UTRAN and a typical EPC. Referring to FIG. 2, the eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 3:
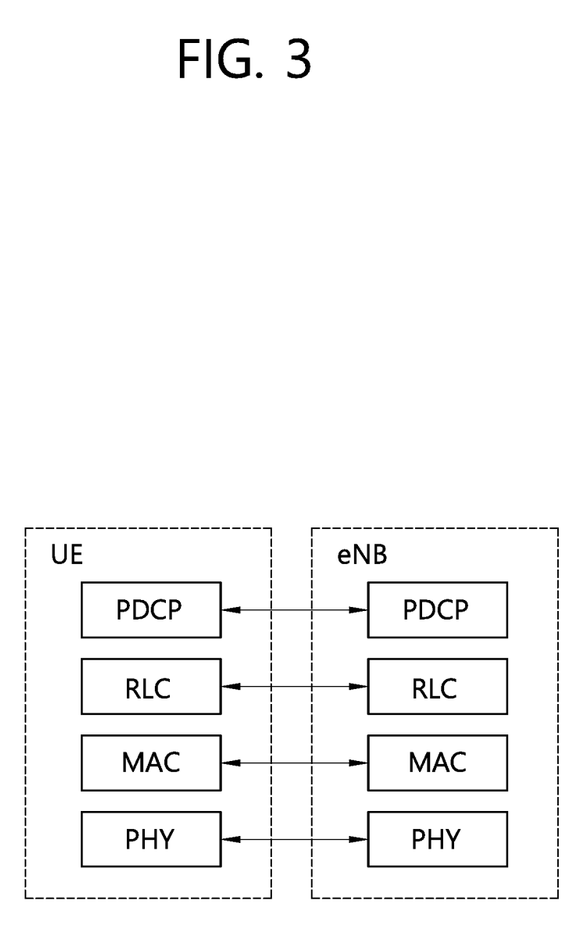
FIG. 3 shows a block diagram of a user plane protocol stack of an LTE system.
Figure 4:
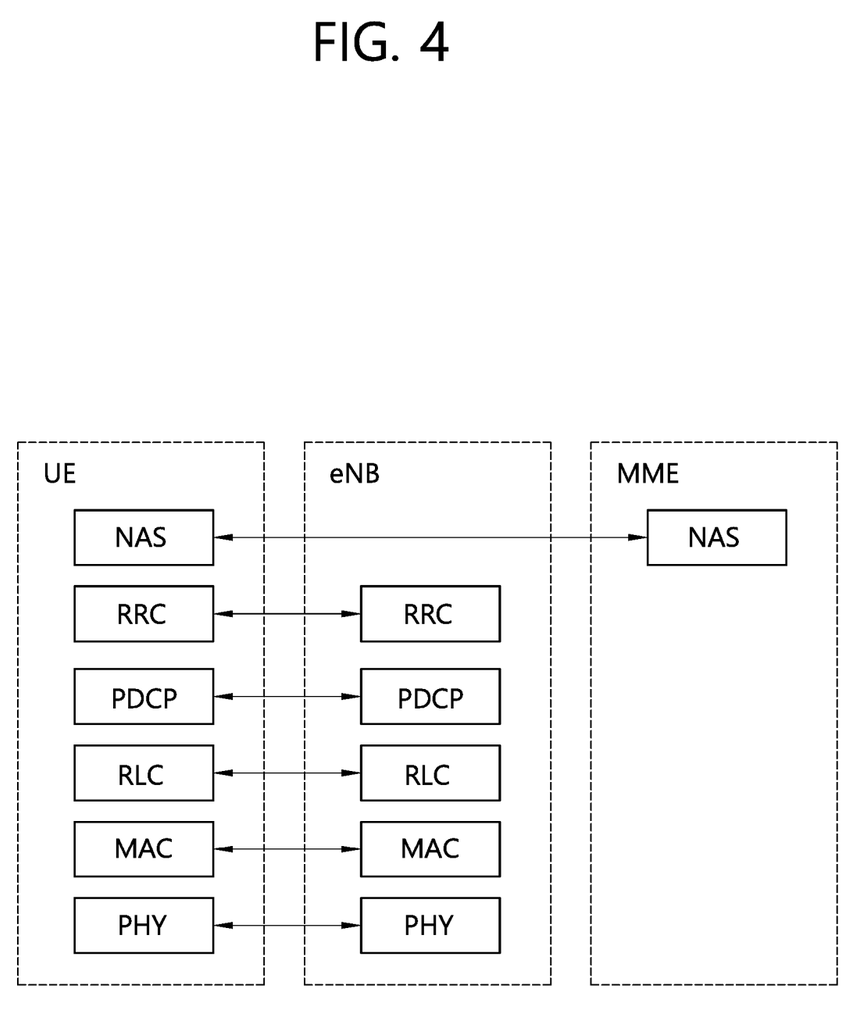
FIG. 4 shows a block diagram of a control plane protocol stack of an LTE system.

FIG. 3 shows a block diagram of a user plane protocol stack of an LTE system. FIG. 4 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 3, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 4, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Figure 5:
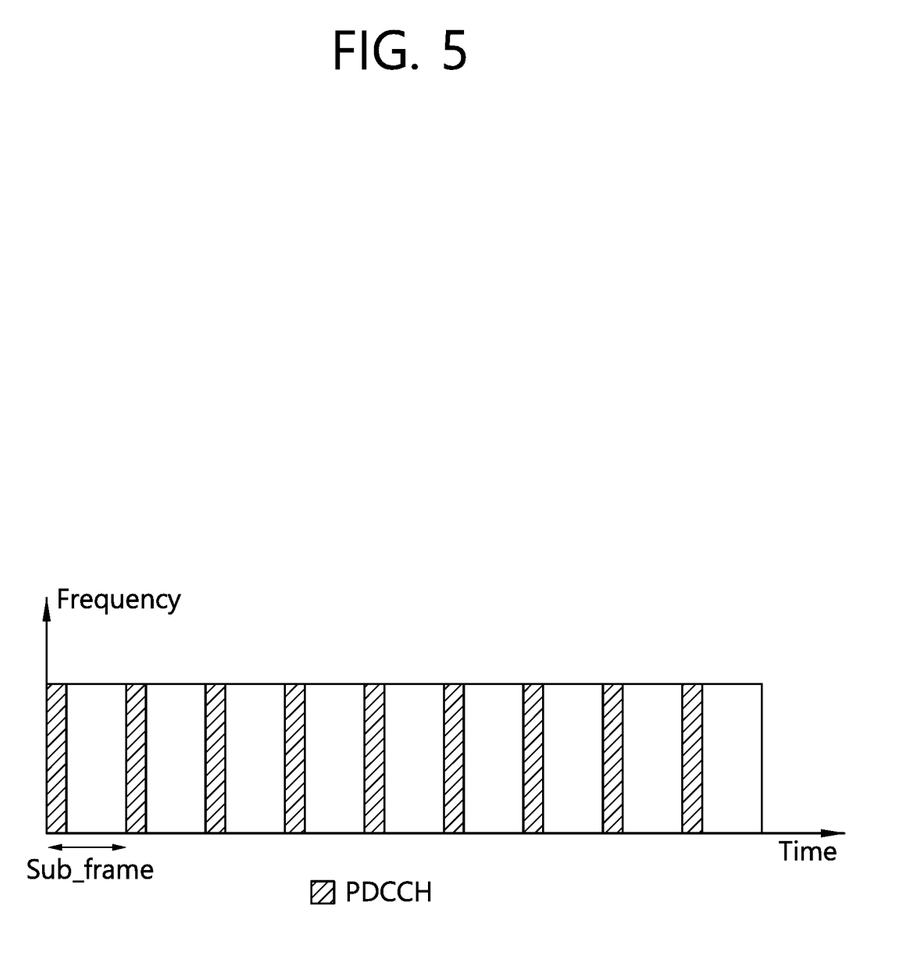
FIG. 5 shows an example of a physical channel structure.

FIG. 5 shows an example of a physical channel structure. A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, an uplink shared channel (UL-SCH) for transmitting user traffic or control signals, etc. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

In an LTE system, there are multiple components contributing to the total end to end delay for connected UEs. The limitations in performance are in general use case dependent, for which, e.g. UL latency may influence the DL application performance and vice versa. Examples of sources to latency are listed below.

(1) Grant acquisition: A UE with data to send must send a scheduling request (SR) and receive a scheduling grant before transmitting the data packet. In order to send a SR, it must wait for a SR-valid PUCCH resource and a corresponding scheduling grant transmitted to the UE in response. When the grant is decoded the data transmission can start over PUSCH.

(2) Random access: If the UL timing of a UE is not aligned, initial time alignment is acquired with the random access procedure. The time alignment can be maintained with timing advance commands from the eNB to the UE. However, it may be desirable to stop the maintenance of UL time alignment after a period of inactivity, thus the duration of the random access procedure may contribute to the overall latency in RRC_CONNECTED. The random access procedure also serves as an UL grant acquisition mechanism (random access based scheduling request). Therefore, for cases where random access is needed, no separate PUCCH based SR procedure/step is needed.

(3) Transmission time interval (TTI): The transmission of a request, grant, or data is done in subframe chunks with a fixed duration (1 ms), which is the source of a delay per packet exchange between the UE and the eNB.

(4) Processing: Data and control need to be processed (e.g. encoded and decoded) in the UE and eNB. Data processing is a source of processing delays, which are proportional to the transport block (TB) size. The processing of control information is typically less dependent on TB size.

(5) HARQ round trip time (RTT): For UL transmission in frequency division duplex (FDD), the HARQ acknowledgement (ACKK) for a packet received by the eNB in subframe n is reported in subframe n+4. If a retransmission is needed by the UE, this is done in subframe n+8. Thus, the HARQ RTT is 8 ms for FDD UL. For time division duplex (TDD), RTT depends on TDD configuration. The RTT for DL transmissions is not specified in detail, as the HARQ scheme is asynchronous. The HARQ feedback is available at subframe n+4 in FDD, and retransmissions can typically be scheduled in subframe n+8 or later if needed.

(6) Core/Internet: In the core network, packets can be queued due to congestion and delayed due to transmission over backhaul links. Internet connections can be congested and therefore add to the experienced end-to-end packet delay. EPC and/or Internet delays vary widely. In the context of latency reductions, it is reasonable to assume that latency performance of the transport links is good.

For example, Table 1 shows a typical radio access latency components for a UL transmission from a UE without a valid UL grant.

TABLE 1

| Component | Description | Time (ms) |
|---|---|---|
| 1 | Average waiting time for PUCCH (10 ms SR period/1 ms SR period) | 5/0.5 |
| 2 | UE sends SR on PUCCH | 1 |

TABLE 1-continued

| Component | Description | Time (ms) |
|---|---|---|
| 3 | eNB decodes SR and generates the scheduling grant | 3 |
| 4 | Transmission of scheduling grant | 1 |
| 5 | UE processing delay (decoding of scheduling grant + L1 encoding of UL data) | 3 |
| 6 | Transmission of UL data | 1 |
| 7 | Data decoding in eNB | 3 |
| | Total delay (ms) | 17/12.5 |

Referring to Table 1, assuming Rel-8 functionality, the average waiting time for a PUCCH at a periodicity of 10 ms is 5 ms, leading to a radio access latency sum of 17 ms. With a SR period set to 1 ms, the average waiting time is reduced to 0.5 ms, which would lead to a sum of 12.5 ms.

Table 2 shows a typical radio access latency components for a DL transmission.

TABLE 2

| Component | Description | Time (ms) |
|---|---|---|
| 1 | Processing incoming data | 3 |
| 2 | TTI alignment | 0.5 |
| 3 | Transmission of DL data | 1 |
| 4 | Data decoding in UE | 3 |
| | Total delay (ms) | 7.5 |

From the tables, it can be seen that grant acquisition delay, transmission and data processing times are additive.

Existing means to limit latency may include short SR period, pre-scheduling of scheduling grants, semi-persistent scheduling (SPS), etc. However, each of these existing means to limit latency may have drawbacks. With a short SR period, e.g. 1 ms, the control plane overhead is increased which may reduce resource efficiency as more PUCCH resources in the cell to support the same number of users is needed. In addition, PUCCH resources are assigned and reconfigured with dedicated RRC signaling. Pre-scheduling of scheduling grants uses PDCCH resources, and the granted PUSCH resources cannot be used by other UEs, which may limit the radio resource utilization. Further, the UE is expected to send a zero padded transmission also if the buffer of the scheduled UE is empty. With SPS, periodic UL/DL resources can currently not be configured more frequently than every 10 subframes. Also with UL SPS, the UE is expected to send zero padded transmissions that may come with associated inefficient UE battery performance and increased UL interference.

In order to reduce latency, short TTI which may be shorter than current TTI (i.e. 1 ms) has been considered. For example, length of short TTI may be one of 1/2/3/4/7 symbols. When a short TTI is introduced for latency reduction in LTE, E-UTRAN may be configured with both normal TTI with 1 ms and short TTI with a value less than 1 ms, such as 1 symbol or 0.5 ms. Currently, it is unclear how the UE perform random access transmission and PUCCH transmission in short TTI.

In addition, when a contention based PUSCH transmission is introduced for latency reduction in LTE, in order to reduce latency in UL data transmission, two approaches have been considered in 3GPP, one of which is contention based SR (CB-SR) transmission, and the other is contention based PUSCH (CB-PUSCH) transmission. The CB-SR transmission enables more frequent transmission of SR by configuring SR with shorter SR period. Hence, the UE can inform the eNB of need for UL grant as soon as possible if SR is successfully transmitted.

The CB-PUSCH transmission allows the UE to transmit UL data by using the pre-configured UL grants which can be shared by multiple UEs. This of course enables the UE to transmit UL data as soon as the UL data becomes available for transmission. In the pre-scheduling scheme allowed by current specifications, the eNB will assign one separate UL grant for each UE in each pre-scheduling interval, and the assigned UL grant will be wasted if one UE has no available data to transmit during one pre-scheduling interval. For CB-PUSCH transmission, multiple UEs may share the same PUSCH resource (either dynamically granted or configured). Collision will happen if two or more UEs that share the same PUSCH resource perform the PUSCH transmission at the same time, and in this case the eNB may not be able to successfully decode all of the PUSCH transmissions. The CB-PUSCH transmission allows more efficient PUSCH resource utilization compared to the existing pre-scheduling scheme. However, as a result of collision, the potential retransmissions can result in increased latency for colliding UEs.

As described above, the CB-PUSCH transmission requires additional contention resolution methods in case the contention occurs. Therefore, in this approach, for contention resolution, the UE may transmit SR along with PUSCH so that the eNB can provide another UL grant to the UE which fails at PUSCH transmission on the shared PUSCH resource. This means that when the contention occurs and the UE fails at PUSCH transmission on the shared PUSCH resource, the UE may fall back to the legacy operation and perform the sequential procedures of getting UL grant as legacy. This may cause signaling overhead and/or latency between UE and network.

In order to solve the problem described above, a method for performing contention resolution for CB-PUSCH transmission according to an embodiment of the present invention is proposed.

Figure 6:
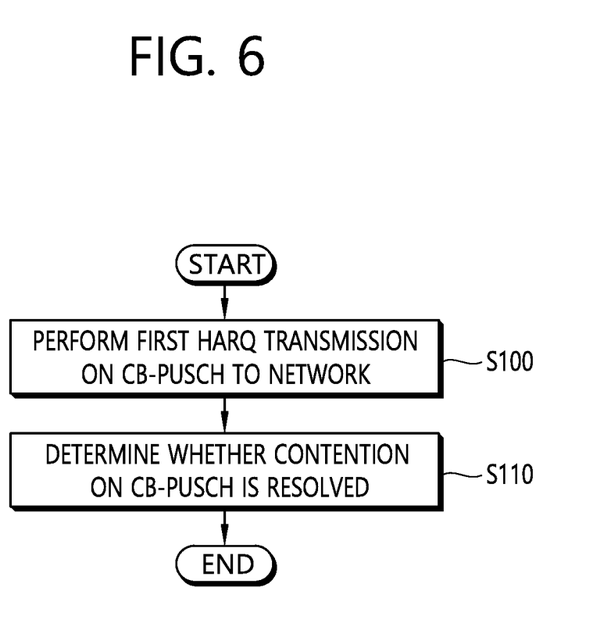
FIG. 6 shows a method for performing, by a UE, contention resolution for CB-PUSCH transmission according to an embodiment of the present invention.

FIG. 6 shows a method for performing, by a UE, contention resolution for CB-PUSCH transmission according to an embodiment of the present invention.

In step S100, the UE performs a first hybrid automatic repeat request (HARQ) transmission on a CB-PUSCH to a network. The CB-PUSCH is a channel for UL data allocated by a pre-configured UL grant which is shared by multiple UEs.

In step S110, the UE determines whether contention on the CB-PUSCH is resolved. The UE may determine whether contention on the CB-PUSCH is resolved by receiving a UL grant on PDCCH for HARQ re-transmission. It may be determined that contention on the CB-PUSCH is resolved if the UL grant includes an identity of the UE. If it is determined that the contention is resolved, the UE may perform a second HARQ transmission of the MAC protocol data unit (PDU) (i.e. the first HARQ retransmission) on a PUSCH to the network by using the UL grant on the PDCCH. Further, the UE may receive an ACK/NACK of the second HARQ transmission on a physical HARQ indicator channel (PHICH) from the network. The UE may determine whether to perform a third HARQ transmission and sequent HARQ retransmissions of the MAC PDU (i.e. the second HARQ retransmission) based on received ACK/NACK on PHICH.

Alternatively, it may be determined that contention on the CB-PUSCH is not resolved if the UE does not receive the corresponding UL grant on a PDCCH for HARQ retransmission or if the UE does not find the corresponding identity (e.g. identity of the UE) on the UL grant on PDCCH. In this case, the UE may transmit either SR (e.g. via random access, dedicated SR (D-SR) or CB-SR) or may retry initial transmission of the MAC PDU on CB-PUSCH for a certain time period.

Figure 7:
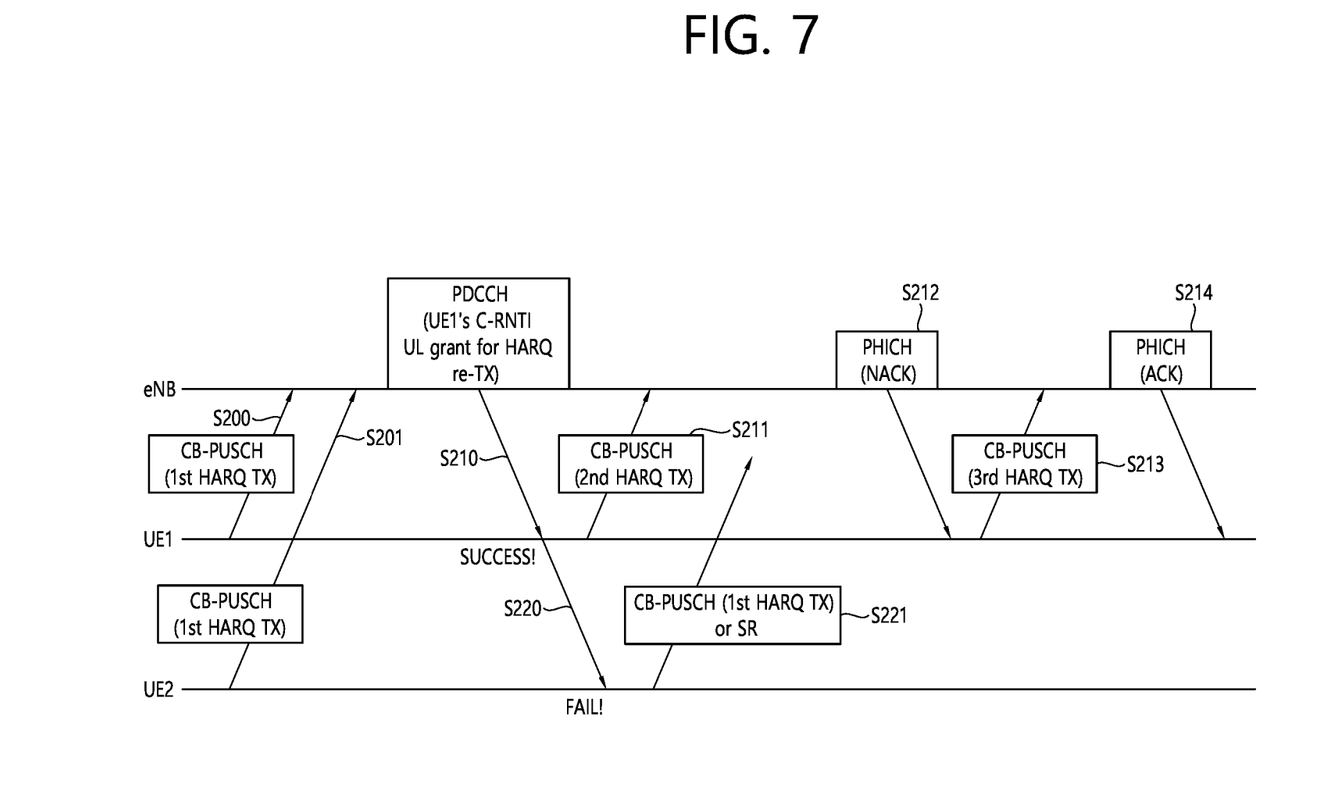
FIG. 7 shows HARQ transmission on CB-PUSCH and retransmission on PUSCH according to an embodiment of the present invention.

FIG. 7 shows HARQ transmission on CB-PUSCH and retransmission on PUSCH according to an embodiment of the present invention. At first, the eNB may grant CB-PUSCH resources by using UL grant on PDCCH addressed by CB-RNTI. The UE may monitor PDCCH addressed by CB-RNTI. The PDCCH may contain HARQ process ID.

For UL transmission of a MAC PDU which may contain RLC PDU, buffer status report (BSR), and/or UE ID, the UE may perform initial HARQ transmission of the MAC PDU on a specific CB-PUSCH resource at a specific time at a specific HARQ process. That is, in step S200, UE1 performs initial HARQ transmission (i.e. first HARQ transmission) on CB-PUSCH, and in step S201, UE1 performs initial HARQ transmission (i.e. first HARQ transmission) on CB-PUSCH. If the PDCCH contains HARQ process ID, the UE may use the HARQ process ID for transmission of the MAC PDU at the specific HARQ process. Otherwise, the UE may determine process ID of the specific HARQ process based on the timing of the initial HARQ process or the UE may assign an additional process ID separated from a set of HARQ processes assigned for legacy PUSCH (i.e. non-contention PUSCH). The additional process ID may be configured by the eNB.

When the UE performs the initial HARQ transmission on a specific CB-PUSCH resource at a specific time for a MAC PDU at a specific HARQ process, the UE may determine whether contention on CB-PUSCH is resolved by receiving UL grant on PDCCH for HARQ retransmission. The PDCCH may be addressed by contention based radio network temporary identity (CB-RNTI) or cell RNTI (C-RNTI). The PDCCH may contain an identity of the UE, such as C-RNTI, indication of the specific CB-PUSCH resource and/or indication of the specific time. If HARQ process ID is assigned by the eNB, the PDCCH may contain HARQ process ID used by this HARQ transmission and retransmissions. Otherwise, the UE may maintain the process ID of the specific HARQ process for HARQ retransmissions of this MAC PDU.

In step S210, it is assumed in this embodiment that UE1 receives the identity of UE1 (e.g. C-RNTI of UE1) on the UL grant on PDCCH (e.g. for HARQ re-transmission). Accordingly, UE1 may consider the initial transmission is successful. In this case, in step S211, UE1 may perform the second HARQ transmission of the MAC PDU (i.e. the first HARQ retransmission) on (legacy) PUSCH or CB-PUSCH at the specific HARQ process by using the UL grant on PDCCH. Further, in step S212, UE1 may receive ACK/NACK for the second HARQ transmission of the MAC PDU on PHICH. In step S213, UE1 may determine whether to perform the third HARQ transmission and sequent HARQ retransmissions of the MAC PDU (i.e. the second HARQ retransmission) at the specific HARQ process based on the received ACK/NACK on PHICH. In step S214, when HARQ (re)transmission of the MAC PDU successfully completes (i.e. acknowledged by the eNB), UE1 may cancel all triggered SRs and all triggered BSRs.

In step S220, it is assumed in this embodiment that UE2 does not find the corresponding identity (e.g. the identity of UE2) on the UL grant on PDCCH or UE2 does not receive the corresponding UL grant on PDCCH for HARQ retransmission (either at a specific time or during a certain time interval). Accordingly, UE2 may consider the initial transmission fails. When it is determined that the initial transmission on CB-PUSCH fails, in step S221, UE2 may transmit either SR (e.g. via random access, D-SR or CB-SR) or may retry initial transmission of the MAC PDU on CB-PUSCH for a certain time period. If UE2 performs transmission of CB-PUSCH for a MAC PDU, but if CB-PUSCH (re)transmissions of the MAC PDU fails for a certain time period, UE2 may transmit SR.

In the description above, timing difference between the HARQ retransmission on a specific CB-PUSCH resource and UL grant for HARQ retransmission may be fixed or variable.

Figure 8:
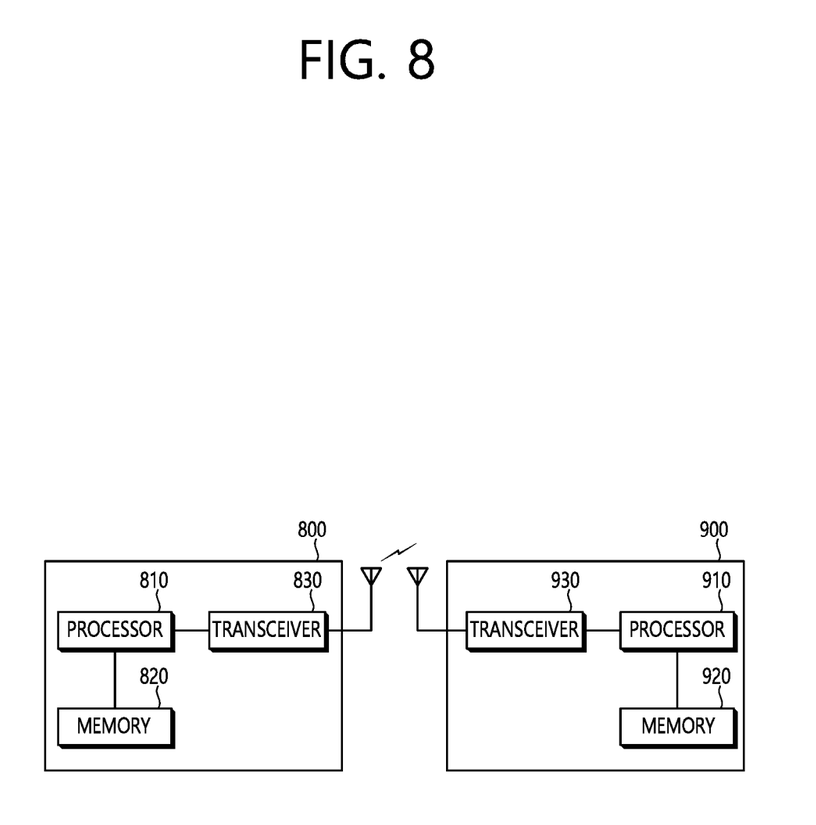
FIG. 8 shows a wireless communication system to implement an embodiment of the present invention.

FIG. 8 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. That is, the processor 910 may perform a first HARQ transmission on a CB-PUSCH to a network, and determine whether contention on the CB-PUSCH is resolved. The CB-PUSCH is a channel for UL data allocated by a pre-configured UL grant which is shared by multiple UEs. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method performed by a user equipment (UE) in a wireless communication system, the method comprising:
   performing a first hybrid automatic repeat request (HARQ) transmission, on a contention based physical uplink shared channel (CB-PUSCH), to a network;
   receiving a UL grant on a physical downlink control channel (PDCCH) from the network,
   wherein the UL grant includes an identity of the UE;
   determining that contention on the CB-PUSCH is resolved based on the identity of the UE; and
   performing a second HARQ transmission for the first HARQ transmission, on a non-contention PUSCH, to the network based on the UL grant,
   wherein the CB-PUSCH is a channel for UL data allocated by a pre-configured UL grant which is shared by multiple UEs.

2. The method of claim 1, further comprising receiving an acknowledgement/non-acknowledgement (ACK/NACK) of the second HARQ transmission on a physical HARQ indicator channel (PHICH) from the network.

3. The method of claim 2, further comprising determining whether to perform a third HARQ transmission, for the second HARQ transmission, based on the received ACK/NACK.

4. The method of claim 1, wherein the UL grant includes a HARQ process ID assigned by the network.

5. The method of claim 1, wherein it is determined that contention on the CB-PUSCH is not resolved when the UE does not receive a UL grant on a PDCCH for HARQ retransmission or the UL grant does not include an identity of the UE.

6. The method of claim 5, further comprising transmitting a scheduling request (SR) to the network via one of a random access, a dedicated scheduling request, or a contention based SR (CB-SR).

7. The method of claim 5, further comprising retrying the first HARQ transmission on the CB-PUSCH to the network for a certain time period.

8. A user equipment (UE) in a wireless communication system, the UE comprising:
   a memory;
   a transceiver; and
   a processor, operatively coupled to the memory and the transceiver,
   wherein the processor is configured to:
      perform a first hybrid automatic repeat request (HARQ) transmission, on a contention based physical uplink shared channel (CB-PUSCH), to a network,
      control the transceiver to receive a UL grant on a physical downlink control channel (PDCCH) from the network,
      wherein the UL grant includes an identity of the UE;
      determine that contention on the CB-PUSCH is resolved based on the identity of the UE; and
      perform a second HARQ transmission for the first HARQ transmission, on a non-contention PUSCH, to the network based on the UL grant,
      wherein the CB-PUSCH is a channel for UL data allocated by a pre-configured UL grant which is shared by multiple UEs.

9. The UE of claim 8, wherein it is determined that contention on the CB-PUSCH is not resolved when the UE does not receive a UL grant on a PDCCH for HARQ retransmission or the UL grant does not include an identity of the UE.

\* \* \* \* \*